United States Patent [19]

Bregy et al.

[11] Patent Number: 4,939,338

[45] Date of Patent: Jul. 3, 1990

[54] WELDED ARTICLE AND METHOD OF MANUFACTURE

[75] Inventors: Louis F. Bregy, Weston; Jack Conti, Wilton; Joseph E. Gorgens, Trumbull, all of Conn.

[73] Assignee: Dresser Industries, Inc., Dallas, Tex.

[21] Appl. No.: 312,680

[22] Filed: May 9, 1986

[51] Int. Cl.[5] .............................................. B23K 9/23
[52] U.S. Cl. ............................ 219/137 WM; 73/742; 219/118
[58] Field of Search .......... 219/118, 137 R, 137 WM; 73/741, 742, 743; 228/263.16

[56] References Cited

U.S. PATENT DOCUMENTS

| 2,914,641 | 11/1959 | Yuhasz | 219/118 |
| 4,384,490 | 5/1983 | Bissell | 73/741 |
| 4,543,833 | 10/1985 | Ferguson | 73/741 |

OTHER PUBLICATIONS

American Society for Metals; Metal Handbook, 9th Ed., vol. 6, pp. 414-424.
Macken et al., CDA Abstract #19297, 1966.
Duisburg, CDA Abstract #17120, 1970.
Kocher et al., CDA Abstract #4095, 1968.
Mendolia et al., CDA Abstract #23325, 1980.
Solomon, "Joining Dissimilar Metals by Gas. Tungsten-are Braze-Welding", Welding Journal 3/1968, pp. 189-191.
Welding Handbook, vol. 4, 7th Ed., "Specific Dissimilar Metal Combinations", p. 535.
T. Lyman, ed. *Metals Handbook*, vol. 6, 1971, pp. 348-349.

*Primary Examiner*—Clifford C. Shaw

[57] ABSTRACT

A pressure gauge fabricated from directly welded pieces of dissimilar metals. The gauge includes a casing, a tubular socket, and a Bourdon tube. The casing is fabricated of stainless steel and has an aperture with a flange. The socket is fabricated of aluminum bronze and is positioned within the aperture and flange in line contact therewith. The tubular socket also has a bore. The Bourdon tube is fabricated of stainless steel and is positioned within the bore in line contact therewith. Single weld lines exist along the lines of contact between the casing and the socket and between the socket and the Bourdon tube as caused by welding without a filler or insert material operatively associated with the single weld lines.

20 Claims, 3 Drawing Sheets

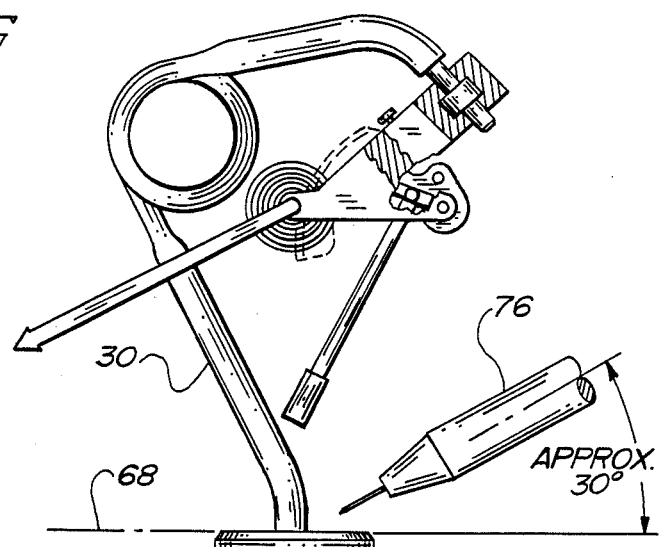
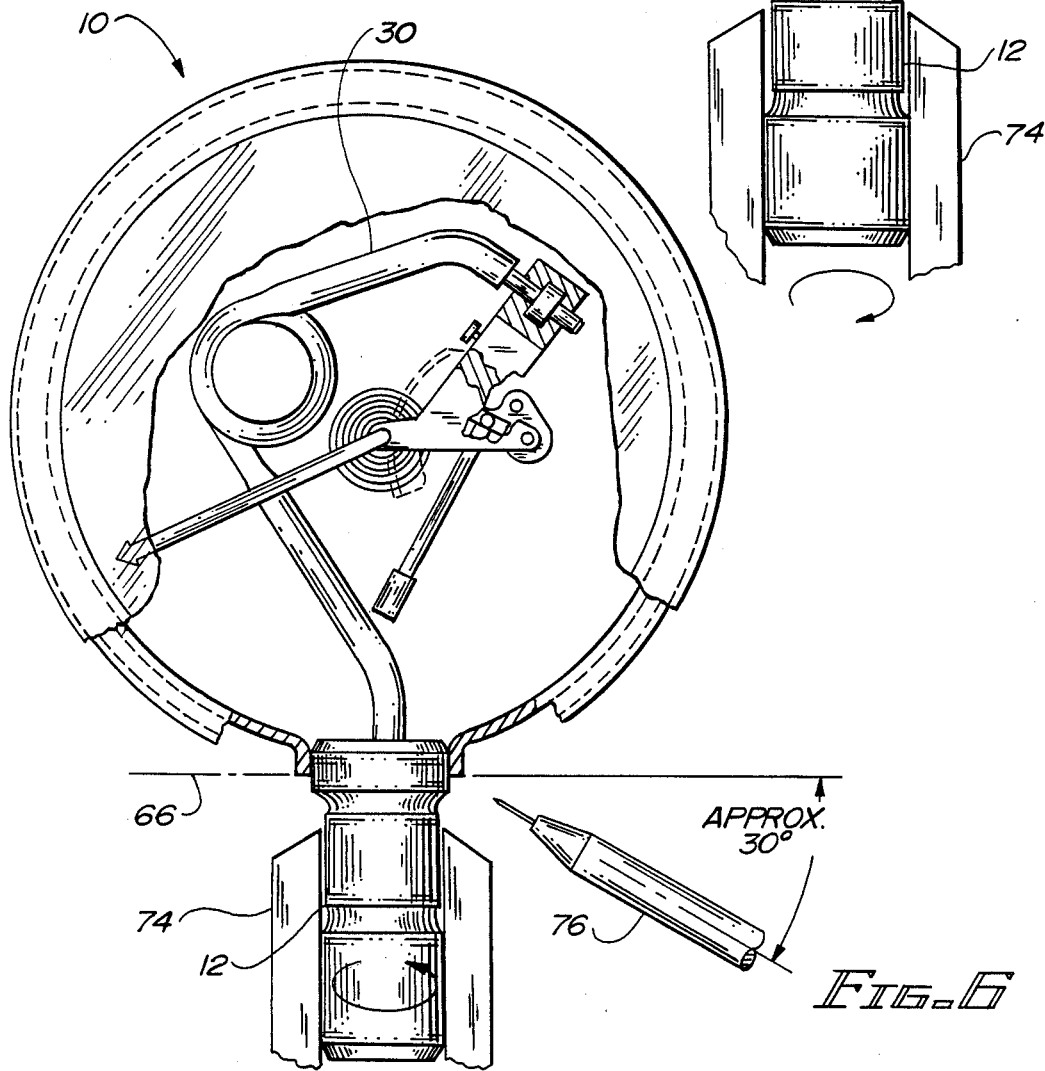

WELDED ARTICLE AND METHOD OF MANUFACTURE

BACKGROUND OF THE INVENTION

1. Field of the Invention

This invention relates to a method of directly welding pieces of dissimilar metals and, more particularly, to a method of welding an aluminum bronze socket with a stainless steel casing and Bourdon tube without the use of a filler or insert material. This invention also relates to the articles manufactured by such method.

2. Description of the Prior Art

Pressure gauges and the like are widely used and commercially available from a great variety of manufacturers. Because of their extensive commercial and industrial uses, such pressure gauges are high-production items and are sold in very price-conscious competition. To be competitive, each manufacturer is continually attempting to reduce production costs by any improvements, however marginal, which may reduce either the labor or materials costs or both while still maintaining product quality and performance.

Pressure gauges normally include a socket by which they may be releasably coupled with the container of fluid under pressure to be measured. The socket is normally fabricated of a long-life material, such as aluminum bronze, which is resistant to the corrosive effects of the fluid whose pressure is being measured. Threads are formed on the outward end of the socket for coupling and uncoupling the socket and gauge with a fluid container such as a tank, pipe, or the like. The central section of the socket is normally provided with one or more flat areas for receiving a wrench to facilitate the coupling and uncoupling of the gauge with respect to the container. Adjacent the other or inward end, the gauge permanently receives the Bourdon tube and casing. Within the casing, are the pressure sensing mechanisms which include the Bourdon tube. Casings and Bourdon tubes are frequently formed of stainless steel, a ferrous alloy which is highly resistant to corrosion, provides long life to the piece, and maintains a good appearance to an observer of the gauge.

Many techniques have been utilized for effecting the casing-to-socket coupling. It is well known to utilize adhesives, elastomeric seals, and other mechanical devices. Such mechanical devices are characterized by less than the desired reliability along with high costs in terms of both materials and workmanship. Welding the joint is likewise well known. Welding, however, normally is acheivable only with pieces of the same or metallurgically similar metals or by introducing a filler or insert material or metal between the dissimilar metals being welded.

The patent literature describes various approaches for coupling both sockets with casings and sockets with Bourdon tubes. Note, for example, U.S. Pat. Nos. 2,125,016 to Gruver; 3,005,867 to Green et al; 4,384,490 to Bissell; and 4,543,833 to Ferguson.

Welding is generally accepted as the preferred technique for coupling both sockets with casings and sockets with Bourdon tubes. The welding process provides a strong, long lasting, fluid tight coupling. However, welding has found limited usage in pressure gauge applications because the preferred materials to be coupled have dissimilar metallurgical properties. All known technical publications on the subject of welding dissimilar metals suggest that stainless steel, a preferred metal for casing and Bourdon tubes, and aluminum bronze, a preferred metal for sockets, cannot be welded directly, but only through the use of a insert or material. Consider, for example: (1) American Society for Metals' Metals Handbook, 9th Edition, Volume 6, pages 414–424; (2) CDA Abstract #19297 of Macken, P.J., and Smith, A.A., CDA, United Kingdom "JOINING PROCESSES" Chapter 20 from *THE ALUMINUM BRONZES* Second Edition, CDA Publication No. 31, Copper Dev Assn, London (1966), 162–178; (3) CDA Abstract #17120 of Wirtz, H., Duisburg, Germany THE SIGNIFICANCE AND USE OF INTERMEDIATE LAYERS DURING WELDING AND METAL SPRAYING OF DISSIMILAR METALS Schweissen and Schneiden, 22 (10), 417–421 (Oct. 1970), (10 FIG., 19 ref.); (4) CDA ABSTRACT #4095 of Kocher, Reiner, Schweissfachingenieur and Leiter der Qualitatsstelle bei der Firma Carl Canzler, Duren, Germany PROPERTIES AND WELDING TECHNIQUES OF COPPER AND COPPER ALLOYS TECHNISCHE UBERWACHUNG, 9 (7), 219–223 (1968), (8 FIG., 11 tables); (5) CDA Abstract #23325 of Mendolia, J., and Mauneau, A., Inst Natl des Sciences Appliquees, Rennes, France WELDING COPPER AND STAINLESS STEEL FOR CRYOGENIC AND VACUUM SYSTEMS Cryogenics, 20 (6), p. 336 (Jun. 1980), (1 FIG. ); (6) Solomon, D,E., University of Michigan, Ann Arbor, Mich. JOINTING DISSIMILAR METALS BY GAS TUNGSTEN-ARC BRAZE-WELDING Welding Journal, 47 (3), 118–184, 189–191 (Mar. 1968), (16 FIG., 1 Table); and (7) WELDING HANDBOOK, Volume 4, 7the Edition, "Specific Dissimilar Metal Combinations", p. 535.

Note, in particular, the last cited article which suggests that a filler material is required for the welding of aluminum bronze to stainless steel.

Even the patent literature fails to teach or suggest the welding of aluminum bronze to stainless steel in the absence of a filler or insert material. Consider U.S. Pat. Nos. 1,779,278 to Kalschne; 2,769,231 to Grenell; 2,914,641 to Yuhasz; 2,937,438 to Lemon; 3,119,632 to Skinner; 3,257,710 to Brown et al., 3,287,540 to Connelly; 3,614,379 to Troton; 3,728,783 to Chartet; and 4,407,441 to Aarts.

Note, in particlar, the patent to Troton which suggests the need for a filler material for joining aluminum bronze to stainless steel.

By way of background, the process of welding is a metal joining process wherein coalescence is produced by heating to suitable temperatures to melt together the base metals with or without the addition of filler metal. If filler metal is used, it shall have a melting point and composition approximately the same as the base metal. Variations of the welding process are brazing and soldering. Brazing is a metal joining process wherein coalescence is produced by use of nonferrous filler metal having a melting point of above 800° Fahrenheit (425° Centigrade), but lower than that of the base metals joined. Soldering is a metal joining process wherein coalescence is produced by heating to suitable temperature and by using a nonferrous alloy fusible at temperatures below 800° Fahrenheit (425° Centigrade) and having a melting point below that of the base metals being joined.

While welding is normally the preferred method for coupling metals in applications such as pressure gauges, the weld line between the metals being coupled can often constitute the major area of weakness in the welded article. When welding with a filler or insert material between the pieces being coupled, two such weld lines of potential weakness are created. In addition, welding without a filler or insert material minimizes the cost of coupling the pieces by eliminating one element from both the process as well as the final product. Welding without a filler or insert material also reduces the method steps and technical skills required on the part of the person performing the welding. Welding without a filler or insert material also renders the process more succeptible to being carried out automatically or semi-automatically. As can be readily understood, welding without a filler or insert material is normally proferred whenever possible or technically feasible.

As illustrated by the great number of prior patents and technical publications, efforts are continuously being made in an attempt to solve the problem of directly welding stainless steel to aluminum bronze and like metals in the absence of a filler or insert material. None of the known patents or technical publications, however, discloses or suggests the present inventive combination of method steps as disclosed herein for reliably, conveniently, accurately and economically welding such dissimilar metals, nor do they disclose or suggest the inventive acticles fabricated from the application of such method steps. The present invention achieves its purposes, objectives, and advantages over the prior art through a new, useful, and unobvious combination of method steps and component elements, with a minimum number of functioning parts, at a reduction of cost for both parts and labor, and through the utilization of only readily available materials and conventional components.

These purposes, objectives, and advantages should be construed as merely illustrative of some of the more prominent features and applications of the present invention. Many other beneficial results can be attained by applying the disclosed invention in a different manner or by modifying the invention within the scope of the disclosure. Accordingly, other purposes, objects, and advantages as well as a fuller understanding of the invention may be had by referring to the summary of the invention and detailed description describing the preferred embodiment in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into a method of directly welding pieces of dissimilar metals. The method comprises the steps of first providing a first piece of stainless steel to be welded and providing a second piece of aluminum bronze to be welded. The first and second pieces are then positioned in line contact with each other along a line at which the first and second pieces are to be welded. Thermal energy from welding mechanisms is then applied along the line of contact to thereby weld the first and second pieces together without the use of a filler or insert meterial. The method further includes the step of effecting linear movement between the welding mechanisms and the first and second pieces to thereby weld along the line of contact. The linear movement is effected by rotating the first and second pieces.

The invention may also be incorporated into a method of fabricating a pressure gauge from pieces of dissimilar metals. The method comprises the steps of first providing of first piece of stainless steel to be welded and providing a tubular socket of aluminum bronze to be welded. The first piece and the tubular socket are then positioned in line contact with each other along a line at which the first piece and the tubular socket are to be welded. Thermal energy from a welding device is then applied along the line of contact to thereby directly weld the first piece and tubular socket together without the use of a filler or insert meterial. The first piece and the tubular socket are supported in a fixture during welding. The method further includes the step of rotating the fixture with respect to the welding device to thereby weld along the line of contact. The welding device is a gas tungsten arc welder with a covering mixture of helium and argon. The first piece may be a casing having an aperture with a flange to receive the socket. In the alternative, the first piece may be a Bourdon tube to be received within a bore of the socket.

The invention may further be incorporated into a directly welded article having a stainless steel first piece and an aluminum bronze second piece in line contact with the first piece. The article also has a single weld line between the first and second pieces along the line of contact caused by welding without a filler or insert material operatively associated with the weld line.

The invention may yet further be incorporated into a pressure gauge fabricated from directly welded pieces of dissimilar metals. The pressure gauge includes a first piece fabricated of stainless steel. The pressure gauge also includes a tubular socket fabricated of aluminum bronze in line contact with the first piece. The pressure gauge also includes a single weld line between the first piece and the tubular socket along the line of contact caused by welding without a filler or insert material operatively associated with the weld line. The first piece may be a casing having an aperture with a flange receiving the socket. In the alternative, the first piece may be a Bourdon tube received within a bore of the socket.

Further, the invention may be incorporated into a pressure gauge fabricated from directly welded pieces of dissimilar metals. The pressure gauge includes a casing fabricated of stainless steel and formed with a circular back wall and with a cylindrical side wall extending forwardly from the edge of the back wall. The casing has an aperture extending through the casing and a flange surrounding the aperture. The pressure gauge also includes a tubular socket fabricated of aluminum bronze positioned within the aperture and the flange and in line contact with the flange. The tubular socket has a bore. The pressure gauge also has a Bourdon tube fabricated of stainless steel positioned within the bore of the socket and in line contact with the flange. A single weld line is located along at least one of the lines of contact caused by welding without a filler or insert material operatively associated with the single weld line. The single weld line is located along the line of contact between the casing and the socket. The single weld line is located along the line of contact between the Bourdon tube and the socket. The single weld line is located along both of the lines of contact.

Yet further, the invention may be incorporated into a pressure gauge fabricated from directly welded pieces of dissimilar metals. The pressure gauge includes a casing fabricated of stainless steel and formed with a circular back wall and with a cylindrical side wall extending forwardly from the edge of the back wall. The casing has an aperture extending through the side wall and a flange surrounding the aperture. The pressure gauge also includes a tubular socket fabricated of aluminum bronze positioned within the aperture and the flange and in line contact with the flange. The tubular socket has a bore. The pressure gauge also has a Bourdon tube fabricated of stainless steel positioned within the bore of the socket and in line contact with the flange. A single weld line is located along at least one of the lines of contact caused by welding without a filler or insert material operatively associated with the single weld line. A single weld line is located along both of the lines of contact.

Lastly, the invention may be incorporated into a pressure gauge fabricated from directly welded pieces of dissimilar metals. The pressure gauge includes a casing fabricated of stainless steel and formed with a circular back wall and with a cylindrical side wall extending forwardly from the edge of the back wall. The casing has an aperture extending through the back wall and a flange surrounding the aperture. The pressure gauge also includes a tubular socket fabricated of aluminum bronze positioned within the aperture and the flange and in line contact with the flange. The tubular socket has bore. The pressure gauge also has a Bourdon tube fabricated of stainless steel positioned within the bore of the socket and in line contact with the flange. A single weld line is located along at least one of the lines of contact caused by welding without a filler or insert material operatively associated with the single weld line. A single weld line is located along both of the lines of contact. Lastly, the invention may be incorporated into a pressure gauge fabricated from directly welded pieces of dissimilar metals. The pressure gauge includes a casing fabricated of stainless steel and formed with a circular back wall and with a cylindrical side wall extending forwardly from the edge of the back wall. The casing has an aperture extending through the back wall and a flange surrounding the aperture. The pressure gauge also includes a tubular socket fabricated of aluminum bronze positioned within the aperture and the flange and in line contact with the flange. The tubular socket has a bore. The pressure gauge also has a Bourdon tube fabricated of stainless steel positioned within the bore of the socket and in line contact with the flange. A single weld line is located along at least one of the lines of contact caused by welding without a filler or insert material operatively associated with the single weld line. A single weld line is located along both of the lines of contact.

The foregoing has outlined rather boardly the more pertinent and important features of the present invention in order that the detailed description of the invention that follows may be better understood and whereby the present contribution to the art can be more fully appreciated. Additional features of the invention will be described hereinafter which form the subject of the claims of the present invention. It should be appreciated by those skilled in the art that the conception and the specific embodiments disclosed herein may be readily utilized as a basis for modifying or designing other methods or structures for carrying out the same purposes of the present invention. It should also be realized by those skilled in the art that such equivalent methods and constructions do not depart from the spirit and scope of the invention as set forth in the appended claims.

BRIEF DESCRIPTION OF THE DRAWINGS

For a more complete understanding of the nature, objects, and advantages of the present invention, reference should be had to the following detailed description taken in conjunction with the accompanying drawings wherein:

FIG. 5 is a front elevational view of the pressure gauge of FIGS. 1 and 2 with the casing removed, illustrating the welder in position for welding the Bourdon tube to the socket which is held in a fixture for rotation during welding; and FIG. 6 is a fragmentary front elevational view of the pressure gauge of FIGS. 1 and 2, illustrating the welder in position for welding the casing to the socket which is held in a fixture for rotation during welding.

Similar reference numerals refer to similar parts throughout the several drawings.

DETAILED DESCRIPTION OF THE INVENTION

Figure 1:
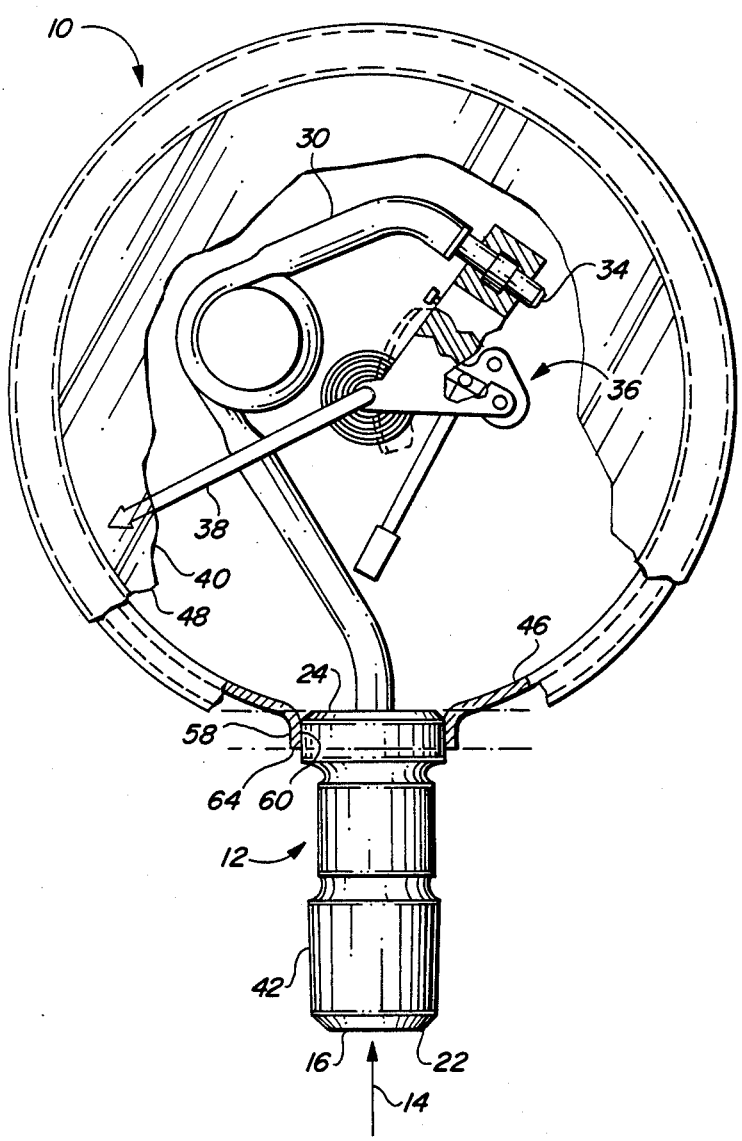
FIG. 1 is a fragmentary front elevational view of a pressure gauge embodying the case-to-socket and Bourdon tube-to-socket connections of the present invention.
Figure 2:
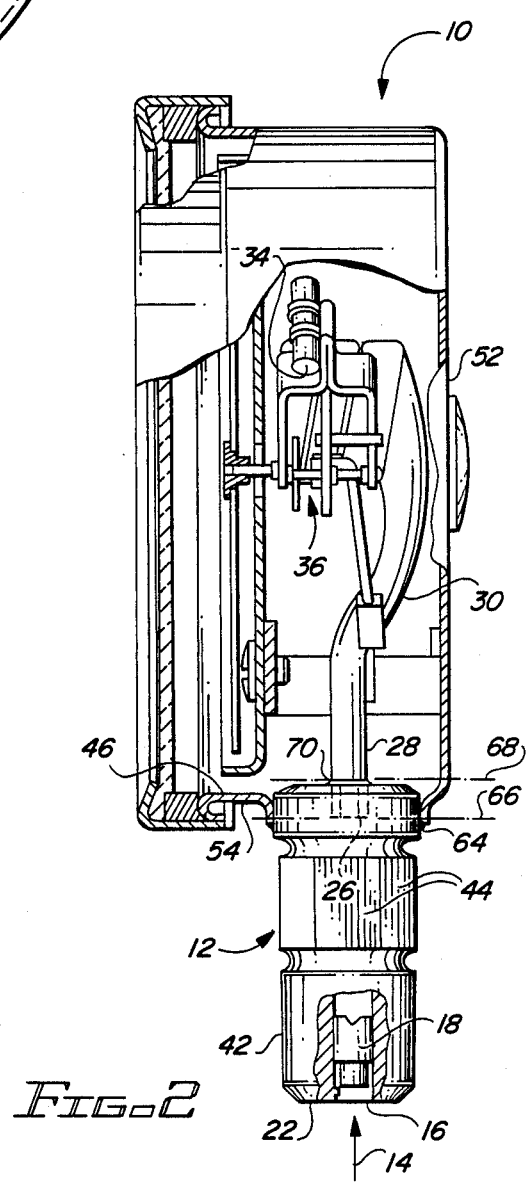
FIG. 2 is a fragmentary enlarged sectional view of the case-to-socket and Bourdon tube-to-socket constructions of FIG. 1.

Referring now to the drawings, a typical pressure gauge 10 is shown which includes a metallic socket 12 for operatively coupling a container, not shown, of fluid under pressure with the other elements of the gauge. The container may be a tank, pipe, or the like. The pressure exerted by the fluid and sensed by the gauge is shown by an arrow 14. This pressure is received in an inlet 16 of a bore 18 extending from the outward end 22 of the socket.

Fluid pressure is communicated inward of the socket 12 through the bore 18 to the inward end 24 of the socket and into the inlet end 26 at the metallic lower portion 28 of a metallic Bourdon tube 30. The lower portion 28 of the Bourdon tube 30 may be separately formed from the remainder of the Bourdon tube 30, then welded thereto. The Bourdon tube has a free end 34 which is subject to arcuate motion displacement in a well-known manner in response to incremental pressure changes of the fluid within the container as sensed by the gauge. Displacement motion of the free end is conducted to an amplifier 36 for producing a correlated, but amplified, motion operating a pointer 38 relative to the pressure values on a dial face 40.

External threads 42 enable the connection of the socket 12 to a container with which the gauge is to be employed. The central section of the socket is normally provided with one or more flat areas 44 for receiving a wrench to facilitate the coupling and uncoupling of the gauge with respect to the container.

Generally enclosing the above-described functioning elements of the gauge, except for the outwardly protruding portion of the socket, is a metallic casing 46. The casing consists of a cup-shaped, shell-like enclosure which, at its front side, supports a transparent crystal 48 to enable viewing the position of the pointer 38 and dial face 40 and thereby the pressure of the fluid. The casing is formed with a circular plate or back wall 52. The casing is also formed of a cylindrical flange or side wall 54 extending forwardly from the periphery or edge of the back wall. It is the front or forward edge of the side wall which supports the crystal 48.

In accordance with the invention, the casing 46 and the lower portion 28 of the Bourdon tube 30 are fabricated of a first metal, preferably stainless steel, while the socket 12 is fabricated of a second metal, preferably an alloy such as aluminum bronze. These two metals are normally characterized in the literature and prior art as metallurgically dissimilar and non-weldable to each other without a filler or insert material or metal.

Stainless steel is a ferrous metal, i.e. formed principally of iron, but with small quantities of carbon and with chromium, with or without additional materials such as nickel, manganese or the like to enhance its corrosion resistant properties. Two grades of stainless steel were tested and both were found to weld successfully with the tested aluminum bronze. These grades were AISI 304 and AISI 316. AISI 304 stainless steel includes a maximum of 0.08% carbon, 2% manganese, 0.030% sulfur, 1% silicon, 0.045% phosphorus, 18% to 20% chrominum, 8% to 12% nickel, and the balance being iron. AISI 316 stainless steel includes a maximum of 0.08% carbon, 2% manganese, 0.030% sulfur, 1% silicon, 0.045% phosphorus, 16% to 18% chromium, 10% to 14% nickel, 2% to 3% molybdenum, and the balance being iron.

The term aluminum bronze is generally applied to metal alloys containing between about 2% and 15% aluminum with the remainder being copper together with lesser amounts of other elements including tin, iron, manganese, nickel, and silicon. Here again, two compositions of aluminum bronze were tested and both were found to weld successfully with the tested stainless steel. These compositions were UNS Alloy C64200 with a nominal composition of 91.2% copper, 7.0% aluminum, and 1.8% silicon and UNS Ally C61400 with a norminal composition of 91% copper, 7% aluminum, and 2% iron.

In the side wall 54 of the casing 46, there is an annular, turned-down flange 58 formed about the socket aperture 60 for making an extended annular contact with the cylindrical exterior surface of the socket 12. The socket 12 thus extends radially through the side wall 54 of the casing 46. The area of contact between the socket 12 and casing 46 adjacent the most outward portion of the flange constitutes the line 66 to be welded. After welding, a bead 64 is formed along the line between the welded metal parts.

The lower portion 28 of the Bourdon tube 30 has an outer diameter to be slip fit into the bore 18 at the inward end 24 of the socket 12. Their line of contact adjacent the inward end of the socket constitutes the line 68 to be welded. After welding, a bead 70 is formed along the line between the welded metal parts.

Welding of the metals is preferably effected by supporting the casing 46 socket 12 and/or the lower portion 28 of the Bourdon tube 30 and socket 12 either by hand or in an appropriate fixture or fixtures 74 to mechanically retain them in their final desired orientation as illustrated by the drawings. If utilized, supporting fixtures require no special care to provide heat dissipating properties or characteristics other than what is normal in the welding art.

A commercially gas tungsten arc welder 76 with a covering mixture of about 75% helium and about 25% argon is then placed closely adjacent to the line of contact between the pieces of metal to be welded. The settings for the welding device or mechanisms in terms of gas ratios, pressure control ratios, envelope regulation control, etc. are all within the normal operating parameters of arc-welders as commercially available. The adjustment of the settings are within the normal skill of a person skilled in the welding art as a function of the pieces to be welded. Motion is then effected between the welding device and the pieces of metal to be welded.

The motion can be effected by hand or by mechanically rotating the fixtures and supported pieces to sequentially and continuously present the weld line to the welding device. Note FIGS. 5 and 6.

During the welding process the welding mechanisms and fixtures, if utilized, will continuously cause sequential portions of the metal pieces to become molten through the application of thermal energy, heat, by the welding device. A continuous puddling and intermixing of the materials results to effect an intermolecular bond upon cooling. The weld will be characterized by having but a single weld line corresponding to the line of contact between the parts being welded. If an insert were utilized, a cross-sectional cut of the metal pieces and weld would reveal two, rather than one, weld lines.

In the preferred embodiment, the diameter of the socket adjacent the casing is about 9/16 inches (1.43 centimeters) and the weld can be effected in about 20 seconds. Consequently, the speed of motion along the weld between the metal pieces and the welding device is about 1.88 inches per second (0.22 centimeters per second). The Bourdon tube-to-socket weld is moved at essentially the same rate of speed.

In carrying out the welding in accordance with the present invention, the welding device was preferably held at about 0.040 inches (1.0 millimeters) from the work pieces being welded.

The above-described method is readily adaptable for manula, semi-automatic or automatic welding.

Tests have been made to demonstrate that the welds achieved in accordance with the present invention are satisfactory, equal to or better than bonds made with previously known methods. Tests with the helium leak detector indicated a reading of better than $10_{-8}$ cc/s showing the good tight capability of the weld. Further, repeated thermal cycling from −18 degrees Centigrade through 66 degress Centigrade left the weld with no fractures or defects.

It should be understood, however, that other types of welding devices, such as commercially available resistance welding devices, perform equally as well as the above described commercially available arc welding device and that such commercially available welding devices are operated within their commercially recommended parameters of usage. In the preferred embodiments, however, the arc-welding device, operating within the ranges as described above, has been found to provide optimum results.

Figure 3:
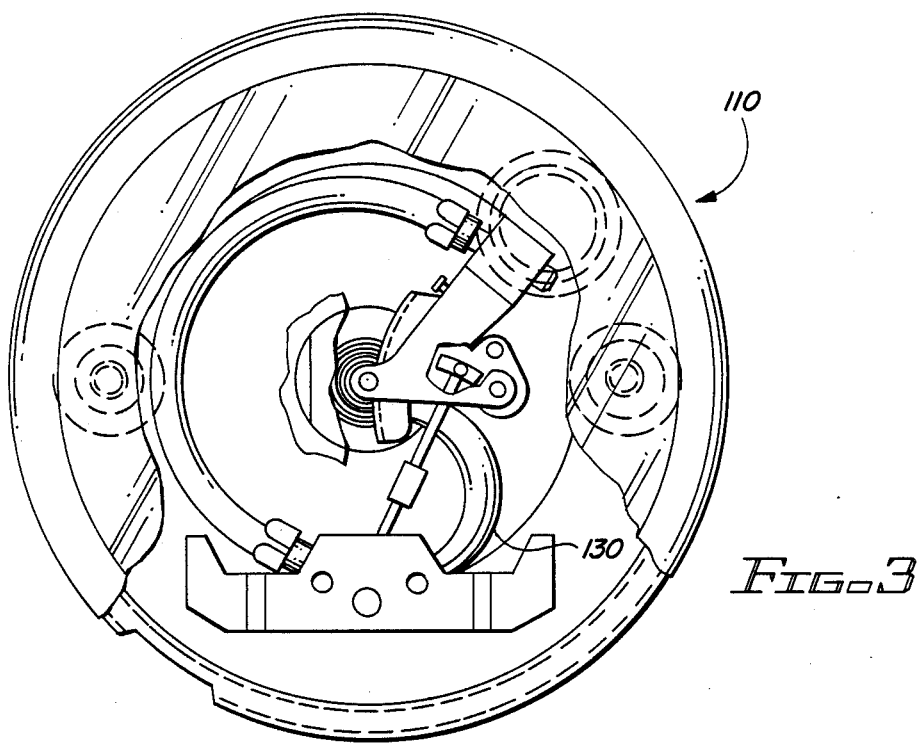
FIG. 3 is a fragmentary front elevational view of a pressure gauge embodying a second or alternate embodiment of the case-to-socket and Bourdon tube-to-socket connections of the present invention.
Figure 4:
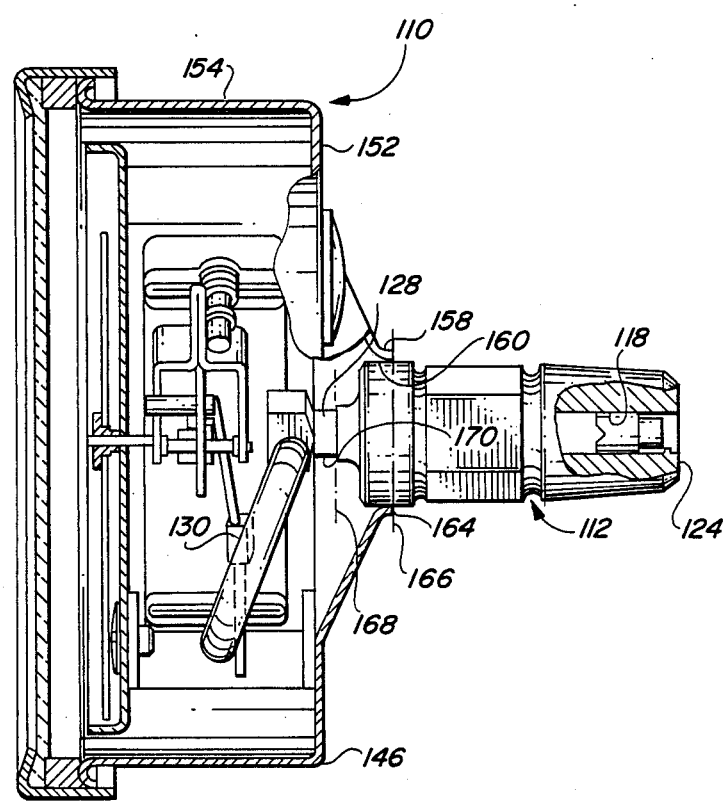
FIG. 4 is a fragmentary side elevational view of the case-to-socket and Bourdon tube-to-socket constructions of FIG. 3 with parts shown in a sectional view.

An alternate or second embodiments of the invention is illustrated in FIGS. 3 and 4. In accordance with the alternate or second embodiment, a gauge 110 is provided with essentially the same internal elements as those of the primary embodiment for sensing and providing a visual display of the pressure being sensed. The internal elements are configured only slightly differently, as shown, in order to accommodate the coupling of the gauge 110 to the source of pressure to be sensed through a socket extending rearwardly from the back wall 152 of the gauge 110 and axially with respect thereto. This is in contrast to the coupling of the primary embodiment wherein the gauge is coupled to the source of pressure to be sensed through a socket 12 extending through the side wall 54, laterally with respect to the face of the gauge 10 and radially with respect thereto.

As in the primary embodiment, the secondary embodiment includes a Bourdon tube 130 with an inward end 128 received within, and coupled to, the inward end 124 of the socket. In the back wall 152 of the casing 146, there is an annular, turned-out flange 158 formed about the socket aperture 160 for making an extended annular contact with the cylindrical exterior surface of the socket 112. The socket 112 thus extends axially through the back wall 152 of the casing 146. The area of contact between the socket 112 and casing 146 adjacent the most outward portion of the flange constitutes the line 166 to be welded. After welding, a bead 164 is formed along the line between the welded metal parts. The lower portion 128 of the Boudon tube 130 has an outer diameter to be slip fit into the bore 118 at the inward end 124 of the socket 112. Their line of a contact adjacent the inward end of the socket constitutes the line 168 to be welded. After welding, a bead 170 is formed along the line between the welded metal parts.

The materials utilized, and the methods of fabrication employed, in the pressure gauge of the second or alternate embodiment of the invention are essentially the same as those in the first or primary embodiment of the invention as described hereinabove.

The present invention has been described in terms of articles and methods for directly welding, i.e. without a filler or insert material, pieces which were fabricated from certain specific dissimilar metals. It should be understood, however, that the method disclosed herein could be utilized to weld dissimilar metals other than those specifically disclosed hereinabove for the pressure gauge. Conversely, the article, a pressure gauge, is not the only article which could be fabricated by welding in accordance with the principles of the present invention.

The present disclosure includes that information contained in the appended claims as well as that in the foregoing description. Although the invention has been described in its preferred forms or embodiments with a certain degree of particularity, it is understood that the present disclosure of the preferred forms or embodiments has been made by way of example only and that numerous changes in the details of construction, fabrication, and use, including the combination of component elements and method steps, may be resorted to without departing from the spirit and scope of the appended claims.

What is cliamed is:

1. A method of directly welding pieces of dissimilar metals comprising the steps of:
   providing a first piece of stainless steel to be welded;
   providing a second piece of aluminum bronze to be welded;
   positioning said first and second pieces in line contact with each other along a line at which said first and second pieces are to be welded; and
   applying thermal energy from welding mechanisms along said line of contact to thereby weld said first and second pieces together without the use of a filler or insert material.

2. The method as set forth in claim 1 and further including the step of effecting linear movement between said welding mechanisms and said first and second pieces to thereby weld along said line of contact.

3. The method as set forth in claim 2 wherein said linear movement is effected by rotating said first and second pieces.

4. A method of fabricating a pressure gauge from pieces of dissimilar metals comprising the steps of:
   providing a first piece of stainless steel to be welded;
   providing a tubular socket of aluminum bronze to be welded;
   positioning said first piece and said tubular socket in line contact with each other along a line at which said first piece and said tubular socket are to be welded; and applying thermal energy from a welding device along said line of contact to thereby directly weld said first piece and tubular socket together without the use of a filler or insert material.

5. The method as set forth in claim 4 wherein said first piece and said tubular socket are supported in a fixture during welding and further including the step of rotating said fixture with respect to said welding device to thereby weld along said line of contact.

6. The method as set forth in claim 5 wherein said welding device is a gas tungsten arc welder with a covering mixture of helium and argon.

7. The method as set forth in claim 6 wherein said first piece is a casing having an aperture with a flange to receive said socket.

8. The method as set forth in claim 6 wherein said first piece is a Bourdon tube to be received within a bore of said socket.

9. A directly welded article having a stainless steel first piece, and an aluminum bronze second piece in line contact with said first piece, and a single weld line between said first and second pieces along said line of contact caused by welding without a filler or insert material operatively associated with said weld line.

10. A pressure gauge fabicated from directly welded pieces of dissimilar metals including:
    a first piece fabricated of stainless steel;
    a tubular socket fabricated of aluminum bronze in line contact with said first piece; and
    a single weld line between said first piece and said tubular socket along the line of contact caused by welding without a filler or insert material operatively associated with said weld line.

11. The pressure gauge as set forth in claim 10 wherein said first piece is a casing having an aperture with a flange receiving said socket.

12. The pressure gauge as set forth in claim 10 wherein said first piece is a Bourdon tube received within a bore of said socket.

13. A pressure gauge fabricated from directly welded pieces of dissimilar metals including:
    a casing fabricated of stainless steel, said casing being formed with a circular back wall and with a cylindrical side wall extending forwardly from the edge of said back wall, said casing having an aperture extending through said casing, said casing also having a flange surrounding said aperture;

a tubular socket fabricated of aluminum bronze positioned within said aperture and said flange and in line contact with said flange, said tubular socket having a bore;

a Bourdon tube fabricated of stainless steel positioned within said bore of said socket and in line contact with said bore; and a single weld line along at least one of the lines of contact caused by welding without a filler or insert material operatively associated with said single weld line.

14. The pressure gauge as set forth in claim 13 wherein said single weld line is located along the line of contact between said casing and said socket.

15. The pressure gauge as set forth in claim 13 wherein said single weld line is located along the line of contact between said Bourdon tube and said socket.

16. The pressure gauge as set forth in claim 13 wherein a single weld line is located along both of the lines of contact.

17. A pressure gauge fabricated from directly welded pieces of dissimilar metals including:

a casing fabricated of stainless steel, said casing being formed with a circular back wall and with a cylindrical side wall extending forwardly from the edge of said back wall, said casing having an aperture extending through said side wall, said casing also having a flange surrounding said aperture;

a tubular socket fabricated of aluminum bronze positioned within said aperture and said flange and in line contact with said flange, said tubular socket having a bore;

a Bourdon tube fabricated of stainless steel positioned within said bore of said socket and in line contact with said bore; and a single weld line along at least one of the lines of contact caused by welding without a filler or insert material operatively associated with said single weld line.

18. The pressure gauge as set forth in claim 17 wherein a single weld line is located along both of the lines of contact.

19. A pressure gauge fabricated from directly welded pieces of dissimilar metals including:

a casing fabricated of stainless steel, said casing being formed with a circular back wall and with a cylindrical side wall extending forwardly from the edge of said back wall, said casing having an aperture extending through said back wall, said casing also having a flange surrounding said aperture;

a tubular socket fabricated of aluminum bronze positioined within said aperture and said flange and in line contact with said flange, said tubular socket having a bore;

a Bourdon tube fabricated of stainless steel positioned within said bore of said socket and in line contact with said bore; and a single weld line along at least one of the lines of contact caused by welding without a filler or insert material operatively associated with said single weld line.

20. The pressure gauge as set forth in claim 19 wherein a single weld line is located along both of the lines of contact.

* * * * *